Aug. 18, 1970　　　　R. L. EVERY ET AL　　　3,524,724
METHOD FOR MAKING AMMONIUM THIOSULFATE
AND AMMONIUM SULFATE
Filed Oct. 12, 1966　　　　　　　　　　2 Sheets-Sheet 1

INVENTORS
RICHARD L. EVERY
PAUL F. COX
BY Robert R. Coleman
ATTORNEY

CONDUCTIVITY VS. SULFUR CONCENTRATION

United States Patent Office 3,524,724
Patented Aug. 18, 1970

3,524,724
METHOD FOR MAKING AMMONIUM THIO-SULFATE AND AMMONIUM SULFATE
Richard L. Every and Paul F. Cox, Ponca City, Okla., assignors to Continental Oil Company, Ponca City, Okla., a corporation of Delaware
Filed Oct. 12, 1966, Ser. No. 586,189
Int. Cl. C01b 1/24, 17/14
U.S. Cl. 23—115                                    5 Claims

ABSTRACT OF THE DISCLOSURE

Method of preparing ammonium thiosulfate and ammonium sulfate comprising in a first stage reacting sulfur dioxide with an aqueous solution to form a solution ammonium bisulfite and in a second stage reacting the solution of ammonium bisulfite with additional ammonia, sulfur dioxide and sulfur. The effluent from the second stage is monitored to determine the sulfur content thereof and the amount of sulfur fed to the second reaction zone is regulated responsive to said monitoring.

---

This invention relates to an improved method of producing ammonium thiosulfate and ammonium sulfate. In one aspect, this invention relates to a continuous process for manufacturing of ammonium thiosulfate and ammonium sulfate. In another aspect, this invention relates to a system of control of an ammonium sulfate and thiosulfate process by monitoring unreacted sulfur and controlling the rating of sulfur addition responsive to said monitoring.

It is known to produce ammonium thiosulfate by reacting $(NH_4)_2S_x$ with $SO_2$ in ammonium hydroxide, U.S. Pat. 2,315,534; by reacting ammonium sulfite and sulfur in aqueous ammonium sulfide, U.S. Pat. 2,412,607; and by bubbling $O_2$ through an aqueous ammonia solution of hydrogen sulfide, U.S. 2,898,190. Ammonium sulfate is made by oxidizing ammonia and $SO_2$ in the presence of steam or water, U.S. 1,934,573; and the most important commercial method of making ammonium sulfate is to react concentrated sulfuric acid with an aqueous solution of ammonia.

All of the above methods involve batch operation; and, since the reactions are carried out in solvent mediums, the product to be recovered must be precipitated out either chemically or by crystallization. Another disadvantage of the above methods is that in order to obtain the proper ratio of reactants they must be carefully gauged and/or continuous checking of the process by tedious laboratory methods are involved with the consequential delay before a correction can be made.

Thus, it is a primary object of this invention to provide a continuous method of producing ammonium thiosulfate in a medium wherein the reactants are soluble but the product is insoluble. Another object of the invention is to provide a method of continuously producing thiosulfate wherein the sulfur to the reaction vessel is controlled responsive to the sulfur concentration in an effluent stream from the reaction vessel.

Another object of this invention is to provide a method of controlling the sulfur content of an ammonia-sulfur solution by continuously measuring conductivity of the solution and regulating at least one feedstream responsive to changes in said conductivity.

In the process, some ammonium sulfate is produced; however, for many applications, this is not harmful and, in fact, is helpful in many cases. We have found, for example, that the product is useful as a photographic fixing solution, but, more importantly, is an ideal soil conditioner. In the latter application, the product can be added to other fertilizer ingredients or can be applied directly to the soil, preferably by adding the product to an irrigation system.

According to this invention, $SO_2$ is reacted with ammonia in aqueous solution to produce ammonium bisulfite, and this product is then reacted with additional ammonia, $SO_2$ and sulfur in a strong aqueous ammonia solution to form ammonium thiosulfate which precipitates out as it forms. In one embodiment, the sulfur in the effluent from the second reaction is continuously monitored and sulfur addition to the second reaction zone is fed to said zone responsive to said monitoring.

By strong aqueous ammonia, we mean that the water should not be more than about 20%, and preferably about 10%, of the ammonia and water. This is necessary since ammonium thiosulfate is soluble in water, whereas our process requires precipitation of product.

The invention can best be described by reference to the drawings of which:

For convenience, valves, pumps and the like are not shown; it being within the skill of the art to provide these. Details of reaction vessels and/or apparatus construction and shape are also omitted, since these will be of conventional design and well within the skill of the art to provide depending upon desired rates, operating conditions and the like.

In the following description, it is assumed that heat losses will equal heat of reactions; however, this will not be necessarily true in commercial installation. The reaction temperatures are not critical, so no particular means for controlling the temperatures and pressures are provided; however, it is within the scope of the invention to provide suitable internal or external cooling means, pressure valves and the like. Preferably, the predetermined reaction temperature will be controlled by the temperature of the feed materials.

Figure 1:
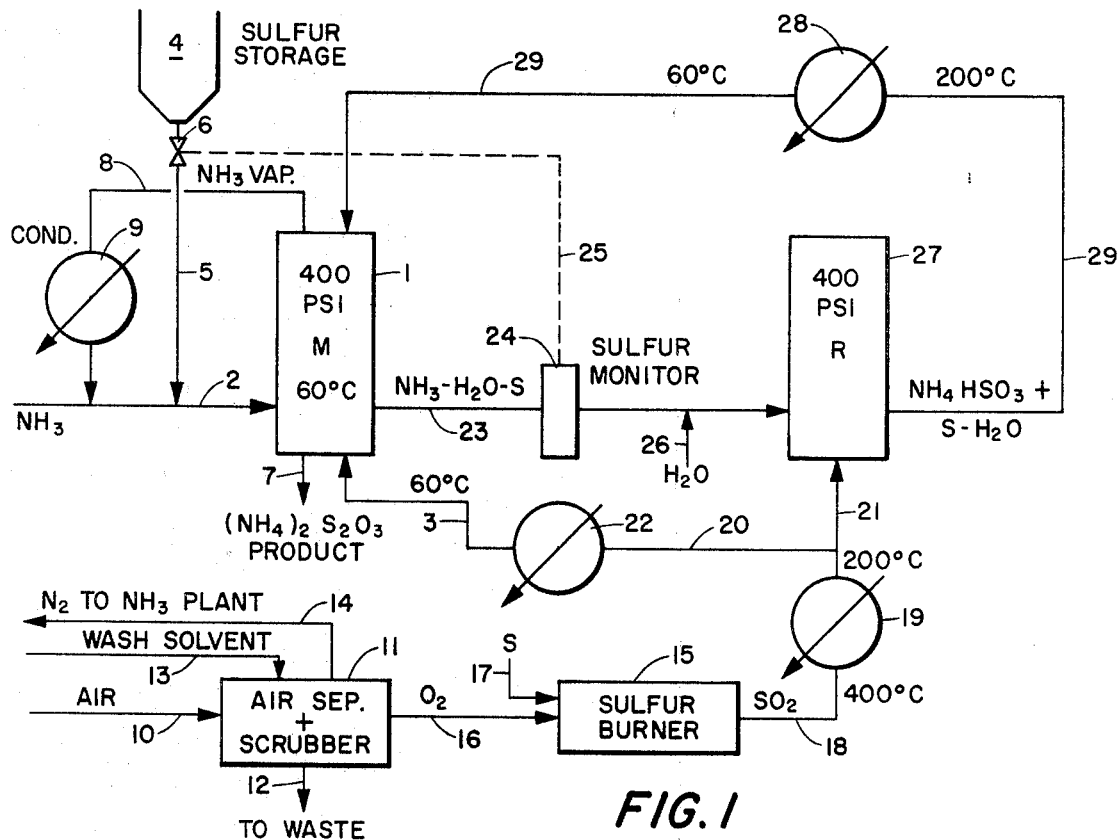
FIG. 1 is a schematic flow sheet for production of ammonium thiosulfate incorporating the method of the invention.

Referring now to the drawings and particularly to FIG. 1, ammonia and sulfur are passed to vessel 1 via conduit 2 and at the same time $SO_2$ is passed to vessel 1 via conduit 3. The ammonia comes from storage, not shown, whereas sulfur from storage bin 4 passes via conduit 5 to the said conduit 2 where it dissolves in the ammonia. The rate of sulfur flow through conduit 5 is controlled via valve 6 which operates responsive to the sulfur in effluent from vessel 1 as will hereinafter be described. Also introduced to vessel 1 via conduit 29 are ammonium bisulfite, sulfur and water, from source hereinafter described. Although the temperatures and pressures in vessel 1 are not critical, for the purpose of this description, we will assume, the reaction pressure is 400 p.s.i. and the temperature is 60° C.

The ammonia, sulfur and ammonium bisulfite react to form primarily ammonium thiosulfate along with lesser amounts of ammonium sulfite and ammonium sulfate. These products are not soluble in the ammonia and precipitate out and settle in the vessel. The precipitate can be periodically scraped out via conduit 7, but preferably, the bottom of this vessel will be cone shaped and the product continuously withdrawn via said conduit 7. It will be obvious that the product will be wet with liquid ammonia, water and dissolved sulfur; and the product can be freed of the ammonia and water by conventional drying means with the vapors condensed and recycled to the system if desired. In any case, there will also be some sulfur contaminant which can be removed by solvent wash such as $NH_3$ or carbon bisulfide, if desired. However, for fertilizer application, the sulfur contaminant would be a desirable additional ingredient.

There is always an excess of ammonia in vessel 1 of which a portion will be vaporized under the reaction condition herein described. These ammonia vapors are taken overhead via conduit 8 through condenser 9 and the condensed ammonia passed back to vessel 1 via conduit 2 with the fresh ammonia feed.

The $SO_2$ utilized in our method can be supplied from any convenient source. We have chosen to illustrate combustion of sulfur with oxygen; however, it is obvious that air can be used and the $SO_2$ separated from the other ingredients of air composition subsequent to burning.

Air is passed via condut 10 to zone 11 which comprises a conventional air separation system, such as liquefying and scrubbing, to separate $O_2$, $N_2$ and $CO_2$. The $CO_2$ and other dissolved contaminants which might be present are passed to waste via conduit 12. Wash solvent, usually water, is introduced to zone 11 via conduit 13. Nitrogen is taken overhead via conduit 14 and sent to storage or ammonia plant, not shown, as desired.

The oxygen from zone 11 passes to sulfur burner 15 via conduit 16 while sulfur is introduced to the burner via conduit 17. The sulfur is burned to $SO_2$ and leaves the burner at about 400° C. via conduit 18 and passes through heat exchanger 19 here it is cooled to about 200° C. This unit 19 is preferably in the nature of a waste heat boiler; however, it can be simply a heat exchanger or cooler. The 200° C. $SO_2$ is then divided into two streams, 20 and 21. That $SO_2$ in stream or conduit 20 is further cooled in heat exchanger 22 down to the temperature of the reactor vessel 1, e.g. 60° C., and passed to vessel 1 via conduit 3 as previously described.

The effluent solvent, aqueous ammonia containing sulfur in reaction vessel 1, is passed via conduit 23 to vessel 27. In conduit 23 is a sulfur monitoring device 24 which will be hereinafter described wth reference to FIG. 2. The amount of sulfur in the effluent is not critical; however, since it will show up as impurity in the product, it will generally be held at some percentage less than about 5%, preferably 1 to 2 percent. The sulfur content is continuously monitored by the sulfur monitor 24 which is operably connected to control valve 6 via conduit 25. Thus, valve 6 opens and closes thereby controlling the amount of sulfur introduced to vessel 1 responsive to changes detected by means 24. Downstream from monitor 24, water is introduced to conduit 23 via conduit 26. The ammonia, water and sulfur from conduit 23, with additional water from conduit 26, then passes to vessel 27 via conduit 23 wherein it is contacted by $SO_2$ from conduit 21, previously described. Again, the reaction conditions are not critical; however, for the purpose of this description, we will assume 400 p.s.i. and 200° C. The $SO_2$ then reacts with ammonia and water to form ammonium bisulfite which, along with unreacted water and sulfur, passes via conduit 29 through heat exchanger 28, where the stream is cooled to 60° C., back to reaction vessel 1, previously described.

The above process has been described to illustrate the invention. It would be obvious that the sulfur to vessel 1 and the water to vessel 27 could be introduced directly to these vessels, if desired; that an ammonia vapor condensed could be provided for vessel 27 as is provided for vessel 1; and that bleed valves for removing build-up of undesirable gases and the like can be provided as well as many other modifications as the particular conditions require. In some cases, it might be desirable, for example, to use the effluent cooling water from heat exchangers 22 and 28 for the cooling water in heat exchanger 19.

This exchanger 19 could be in the form of a waste heat boiler, and the steam used to generate electricity to operate pumps and the like or could be used for driving a steam engine for other power purposes. The use made of this recovered heat or energy is, of course, not a part of this invention.

According to our invention, any method of continuously measuring sulfur concentration in conduit 23 can be employed. The simplest means is by measuring conductivity. Ammonia is similar to water as a solvent Both have a low conductivity due to auto-dissociation:

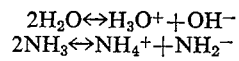

However, both of these solvents have high dielectric constants and support ionization of many solutes. The ions formed increase the solution conductivity. The solubility of sulfur in ammonia is the result of a reaction between sulfur and ammonia in which ammonia and polysulfide ions are formed:

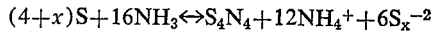

Figure 4:
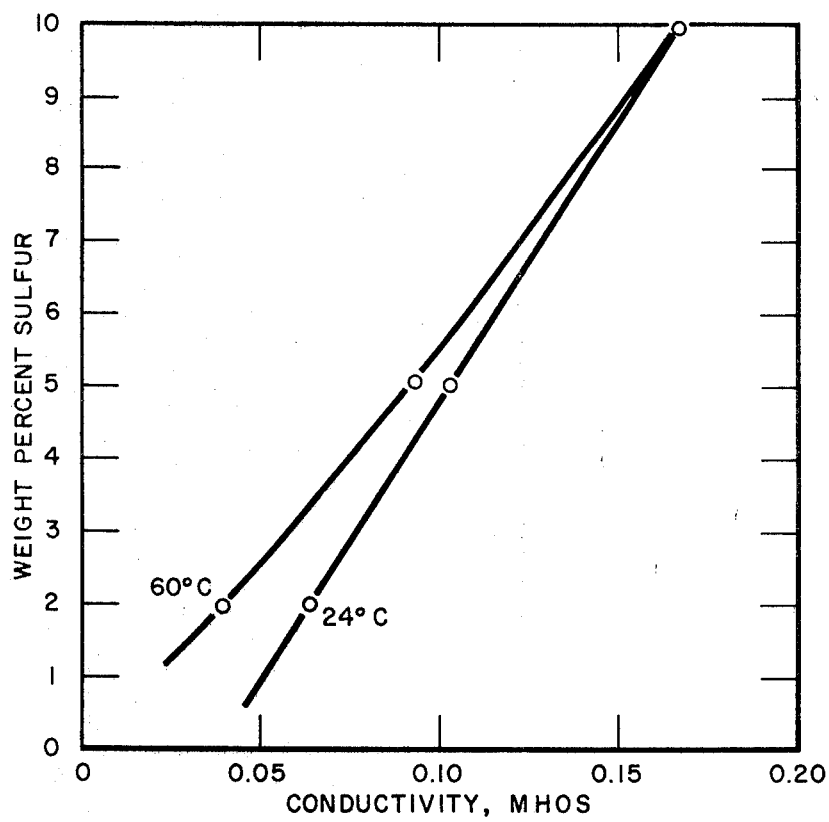
FIG. 4 is a plot of conductivity of a sulfur in aqueous ammonia solution versus percent sulfur.

It can be seen then that the conductivity of sulfur-ammonia solutions is many times that of the ammonia alone. A linear relationship has been found between sulfur concentration and conductivity (see FIG. 4). In FIG. 4, the conductivity is plotted against concentration measured at 24° C. and 60° C. This conductivity varies with temperature; however, it is within the skill of the art to prepare solutions of known concentrations and to prepare a chart suitable for the selected temperature. Since our description describes a method wherein the temperature of the effluent from vessel 1 is 60° C., this chart was prepared for measuring sulfur concentrations at that temperature and show that temperature does have an effect by comparing conductivity at two temperatures.

Figure 2:
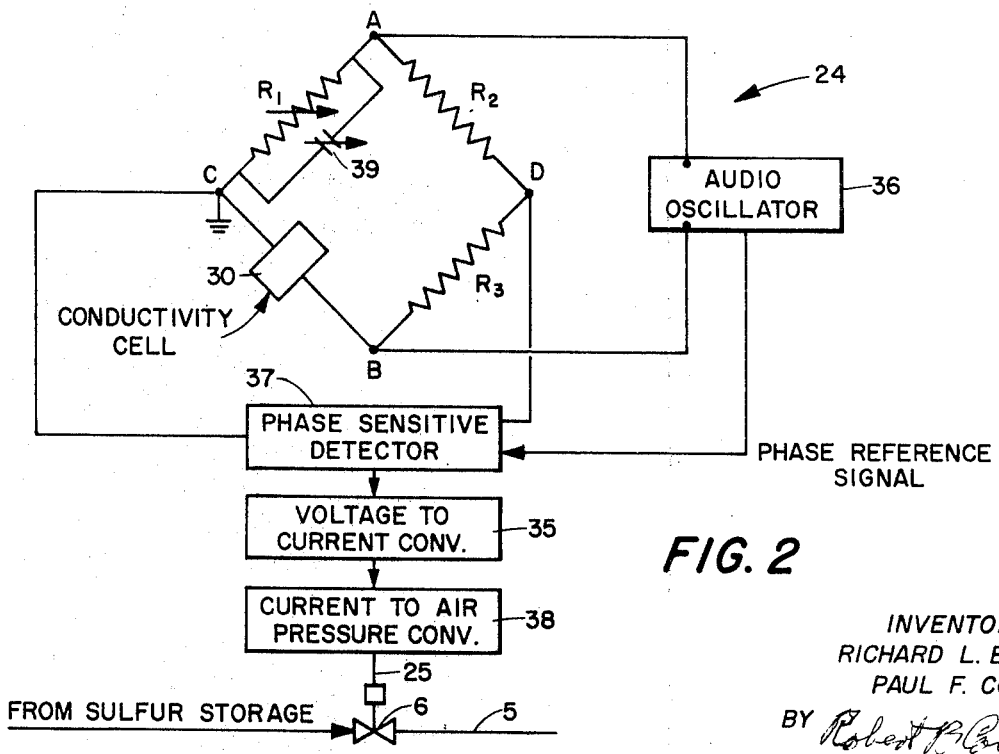
FIG. 2 is a schematic illustration of a typical sulfur monitoring apparatus.
Figure 3:
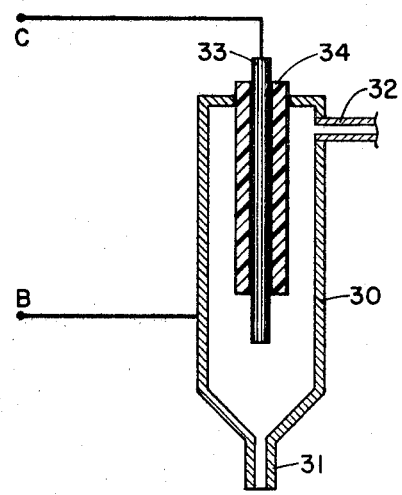
FIG. 3 is a detail of a suitable conductivity cell.

While any means for measuring sulfur concentration and controlling the sulfur feed responsive to changes in the pre-determined concentration may be used, FIGS. 2 and 3 illustrate the apparatus utilized by us.

Conductivity cell 30, with inlet 31 and outlet 32, is installed in conduit 23. The cell was made of standard pipe and tubing fittings. The wall of cell 30 served as one electrode and steel rod 33, insulated from the cell by nylon tubing 34, served as the other electrode. The conductivity cell 30 and variable resistor $R_1$ with variable capacitor 39 were connected in series with fixed resistors of equal value ($R_2$ and $R_3$) to form a bridge. An audio oscillator 36 is connected to the resulting bridge at A & B. The frequency of measurement used by us is 1000 c.p.s.; however, it will be obvious that other frequencies can be employed, preferably in the range 100 to 10,000 c.p.s. The variable resistor $R_1$ is adjusted to the sulfur solution's resistance at the desired concentration and temperature. The variable capacitor 39 compensates for the capacitance of the cell 30. Now, when the resistance across the conductive cell varies, the phase sensitive detector 37 detects the direction and amount of unbalance in the bridge between points C and D. The output voltage from phase sensitive detector 37 is converted to current in current converter 35, and this current is converted to air pressure in an air pressure converter 38. The air pressure then drives the control valve 6 via conduit 25.

It will be obvious to those skilled in the art that the above-described method of regulating the sulfur content in sulfur-ammonia solutions would be adaptable to a number of applications. For example, the gas stream containing $H_2S$ or $SO_2$ passing to an ammonia vessel for reaction to form ammonium thiosulfate and ammonium sulfate with some extra sulfur could be controlled by monitoring the sulfur in the effluent from the reaction vessel. Another example illustrating the use of the method would be to control either the ammonia or the sulfur feed to a mixing zone wherein sulfur and ammonia are mixed for fertilizer use responsive to monitoring the sulfur content of the effluent from the mixing zone.

It has been proposed to transport sulfur via pipeline by dissolving sulfur in ammonia, the rate of sulfur to the pipeline can be controlled responsive to monitoring the sulfur content of the pipeline. Many other examples of using this method will occur to those skilled in the art.

Several laboratory runs were made using the method of this invention. The product was recovered, washed free of sulfur, dried and analyzed. The results are given in the table.

| Run No. | Reactants, percent | | | | Temp., °C. | Products, percent | | |
|---|---|---|---|---|---|---|---|---|
| | $SO_2$ | $H_2O$ | $NH_3$ | S | | $(NH_4)_2S_2O_3$ | $(NH_4)_2SO_3$ | $(NH_2)_2SO_4$ |
| 1 | 5 | 5 | 85 | 5 | 25 | 87.0 | 3.4 | 9.6 |
| 2 | 5 | 5 | 85 | 5 | 80 | 84.2 | 11.1 | 4.7 |
| 3 | 5 | 10 | 80 | 5 | 25 | 80.3 | 5.0 | 14.7 |
| 4 | 5 | 10 | 80 | 5 | 80 | 83.6 | 4.1 | 12.3 |
| 5 | 5 | 15 | 75 | 5 | 25 | 84.8 | 3.0 | 12.2 |
| 6 | 5 | 15 | 75 | 5 | 80 | 84.4 | 3.3 | 12.3 |

From the table, it can be seen that high yields of the desired ammonium thiosulfate are obtained. All of these products would be useful as fertilizer ingredients and photographic fixing solutions. Particularly the product of Run 2 with a ratio 8:1 of $(NH_4)_2S_2O_3$ to $(NH_4)_2SO_3$ would be of interest as a fixing solution.

From the foregoing description, it can be seen that our process is continuous and enjoys the further advantage over the art known to us by employing noncorrosive starting materials.

Having thus described the invention, we claim:

1. A continuous method of producing ammonium thiosulfate which comprises continuously passing $SO_2$ to a first reaction zone; continuously passing aqueous ammonia having sulfur dissolved therein to said zone; passing the effluent comprising ammonium bisulfite, sulfur and water to a second reaction zone; passing ammonia, sulfur and $SO_2$ to said second reaction zone wherein the aqueous ammonia solution formed therein is a nonsolvent for ammonium thiosulfate; withdrawing ammonium thiosulfate precipitate from said second zone; passing effluent comprising unreacted ammonia, water and sulfur along with make-up water to said first reaction zone, monitoring the dissolved sulfur in the last said effluent and controlling the amount of said sulfur fed to said second reaction zone responsive to said monitoring.

2. The method of claim 1 wherein said monitoring of sulfur is by measuring conductivity of said effluent.

3. The method of claim 2 wherein product is continuously removed from said second reaction zone.

4. The method of claim 3 wherein the amount of water in said second reaction zone does not exceed about 20% of the ammonia-water solution.

5. The method of claim 4 wherein the product removed from said second reaction zone is washed free of sulfur subsequent to its removal from said zone.

References Cited

UNITED STATES PATENTS 2,219,258   10/1940   Hill _____ 23—115
3,360,355   12/1967   Horsley et al. _____ 23—224 X

FOREIGN PATENTS 713,746   8/1964   Great Britain.

EARL C. THOMAS, Primary Examiner

U.S. Cl. X.R.

23—119, 224; 137—5